(No Model.)

P. HOERLEIN.
BOILER TUBE CLEANER.

No. 589,126. Patented Aug. 31, 1897.

WITNESSES:
David C. Walter
L. E. Brown

INVENTOR:
Philip Hoerlein,
By Simon Hall
His Attorney

UNITED STATES PATENT OFFICE.

PHILIP HOERLEIN, OF TOLEDO, OHIO.

BOILER-TUBE CLEANER.

SPECIFICATION forming part of Letters Patent No. 589,126, dated August 31, 1897.

Application filed February 23, 1897. Serial No. 624,588. (No model.)

*To all whom it may concern:*

Be it known that I, PHILIP HOERLEIN, a citizen of the United States, residing at Toledo, Lucas county, Ohio, have invented certain new and useful Improvements in Boiler-Tube Cleaners, of which the following is a specification.

My invention relates to and has for its object to provide a boiler-tube cleaner which shall be light, strong, and compact, and in which the cutting or scraping teeth shall be radially adjustable. I attain these objects by means of the device hereinafter described, and shown and illustrated in the accompanying drawings, made part thereof, in which—

Figure 1:
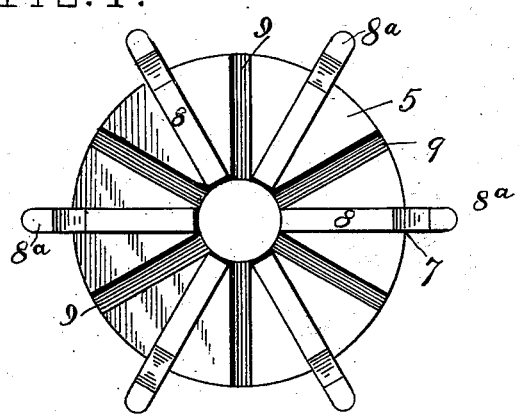
Figure 2:
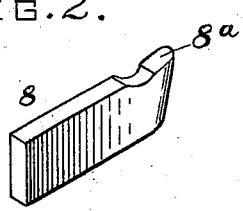
Figure 3:
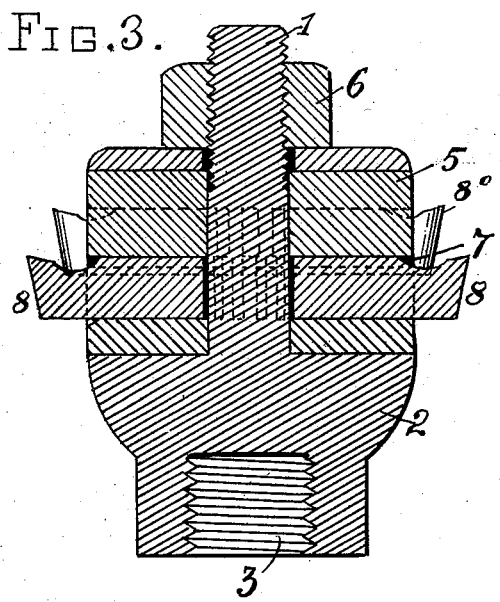
Figure 4:
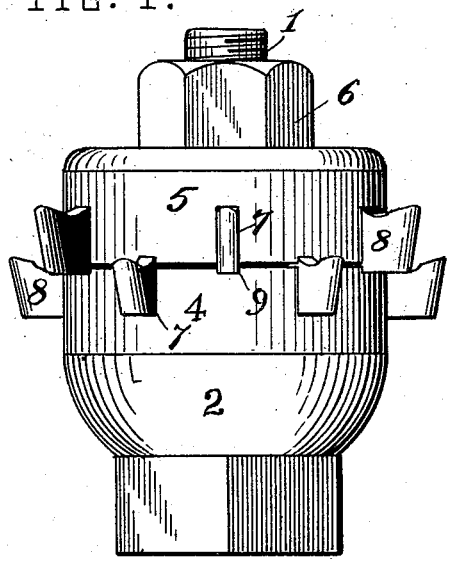

Figure 1 is a plan view of one of the disks, hereinafter referred to, with its cutting or scraping teeth in place; Fig. 2, a perspective view of one of the teeth, hereinafter referred to, detached; Fig. 3, a central longitudinal sectional elevation of my device, and Fig. 4 a side elevation of the same with the various parts assembled and in place.

Like numerals indicate like parts throughout the several views.

In the drawings, 1 is a stout screw-threaded bolt provided with a head or base 2, having a screw-threaded recess 3, into which may be screwed a rod or eye as a handle for the device.

4 and 5 are disks with central openings through which the bolt 1 passes, and 6 is a nut screwed upon the extremity of the bolt 1, clamping the two disks together between the nut and head and holding the parts in fixed relation. The meeting faces of the disks 4 and 5 are slotted radially, as at 7, the slots being nearly the depth of the width of the radially-projecting teeth 8. (Illustrated in Fig. 2.) These radially-projecting teeth are arranged at equidistant intervals with their cutting portions $8^a$ projecting forwardly in the same direction. Half the number of these teeth are mounted in the radial slots in one of the disks, the other half of the number of teeth being in like manner mounted in the other disk, the two sets of teeth alternating with each other, one set being in advance of the other set. (See Figs. 3 and 4.) Each of the meeting faces of the disks 4 5 is provided with shallow radial channels 9 to receive the slightly-projecting edges of the cutting-teeth mounted in the opposing disk. The channels in which the cutting-teeth are set are formed to make a close fit, but the teeth by a tap of a hammer may be driven in or out, so that they will project any desired distance radially, thus fitting the implement for use in a boiler-tube of any size.

When the teeth are in place and properly adjusted, the two disks are slipped over the bolt 1, the nut 6 is screwed tightly in place, and the parts are now all clamped and held rigidly in fixed relation, and the device is ready for use.

Having described my invention, what I claim, and desire to secure by Letters Patent, is—

A boiler-tube cleaner comprising a threaded bolt, a head or base, integral with said bolt, means for securing a handle to said base, a pair of disks having central openings therethrough, mounted upon said bolt and having radial slots in their meeting faces, the slots of one disk alternating with the slots of the other disk, radially-projecting cutting-teeth in said slots, and a nut upon the extremity of said bolt, whereby said disks are forced together and said teeth clamped in place.

PHILIP HOERLEIN.

In presence of—
L. E. BROWN,
F. M. DOTSON.